United States Patent
Marks et al.

(10) Patent No.: US 9,098,818 B2
(45) Date of Patent: Aug. 4, 2015

(54) SYSTEM AND METHOD FOR MANAGING TASK PERFORMANCE AT A DATA CENTER

(75) Inventors: Tyler M. Marks, Verona, WI (US); Jason J. Perry, Madison, WI (US)

(73) Assignee: Facility Gateway Corporation, Madison, WI (US)

( * ) Notice: Subject to any disclaimer, the term of this patent is extended or adjusted under 35 U.S.C. 154(b) by 233 days.

(21) Appl. No.: 13/437,240

(22) Filed: Apr. 2, 2012

(65) Prior Publication Data
US 2013/0262170 A1    Oct. 3, 2013

(51) Int. Cl.
G06Q 10/00    (2012.01)
G06Q 10/06    (2012.01)

(52) U.S. Cl.
CPC .. *G06Q 10/06316* (2013.01); *G06Q 10/063114* (2013.01)

(58) Field of Classification Search
CPC ............................................. G06Q 10/063114
USPC ............................................... 705/7.11–7.42
See application file for complete search history.

(56) References Cited

U.S. PATENT DOCUMENTS

| | | | |
|---|---|---|---|
| 2001/0002464 A1* | 5/2001 | Hogan | 702/186 |
| 2003/0130820 A1* | 7/2003 | Lane, III | 702/184 |
| 2003/0158770 A1* | 8/2003 | Carlson et al. | 705/9 |
| 2004/0044554 A1* | 3/2004 | Bull et al. | 705/8 |
| 2005/0015501 A1* | 1/2005 | Kaplan et al. | 709/228 |
| 2006/0217856 A1* | 9/2006 | DeBoard et al. | 701/29 |
| 2007/0021971 A1* | 1/2007 | McKinney et al. | 705/1 |
| 2009/0234703 A1* | 9/2009 | Rasheed | 705/9 |
| 2010/0049576 A1* | 2/2010 | Wilson et al. | 705/9 |
| 2012/0022907 A1* | 1/2012 | Fidler | 705/7.14 |

* cited by examiner

Primary Examiner — Sujay Koneru
(74) Attorney, Agent, or Firm — Foley & Lardner LLP

(57) ABSTRACT

An apparatus for managing a data center. The apparatus for managing a data center can include a memory configured to store asset information, personnel information, and task information, wherein the store asset information, the personnel information, and the task information are linked. The apparatus for managing a data center can also include a processor configured to record a first task information of the task information based on associated asset information of the asset information and associated personnel information of the personnel information. The processor can be further configured to determine a completion of a task associated with the first task information based on the first task information, the associated asset information and the associated personnel information.

19 Claims, 12 Drawing Sheets

SYSTEM AND METHOD FOR MANAGING TASK PERFORMANCE AT A DATA CENTER

BACKGROUND

The present disclosure relates generally to the field of data center facility management. In particular, the present disclosure relates to a system and a method of data center facility asset relationship management in regards to reporting, scheduling and maintenance and history of.

Data centers can be a facility used to house computer systems and associated components, such as telecommunications and storage systems. A data center can include redundant or backup power supplies, redundant data communications connections, environmental controls (e.g., air conditioning, fire suppression) and security devices. Data centers can be large, complex, and located at great distances from one another. Accordingly, data center management can be an important aspect of data center design.

Data center management can include managing and maintaining safety, efficiency, vendor management, procurement, asset management, and operations. In many data centers, vendors perform many mission critical tasks. Given a large number of assets in a data center as well as numerous data center locations, it can be difficult for an organization to efficiently track and manage data centers in addition to the vendors who perform tasks. Therefore, improved systems and methods for data center management are needed.

SUMMARY

One illustrative embodiment relates to an apparatus for managing a data center. The apparatus for managing a data center can include a memory configured to store asset information, personnel information, and task information, wherein the store asset information, the personnel information, and the task information are linked. The apparatus for managing a data center can also include a processor configured to record a first task information of the task information based on associated asset information of the asset information and associated personnel information of the personnel information. The processor can be further configured to determine a completion of a task associated with the first task information based on the first task information, the associated asset information and the associated personnel information.

Another illustrative embodiment relates to method of managing a data center. The method can include recording a first task information of task information based on associated asset information of asset information and associated personnel information of personnel information. The method can also include determining a completion of a task associated with the first task information based on the first task information, the associated asset information and the associated personnel information. The personnel information, and the task information can be linked.

Another illustrative embodiment relates to a non-transitory computer-readable storage medium having instructions stored thereon that, if executed by a computing device, cause the computing device to perform operations. The operations can include recording a first task information of task information based on associated asset information of asset information and associated personnel information of personnel information. The operations can also include determining a completion of a task associated with the first task information based on the first task information, the associated asset information and the associated personnel information. The personnel information, and the task information can be linked.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 is a diagram of a messaging interface in accordance with an illustrative embodiment.

FIG. 10 is a diagram of a list-based data centers interface in accordance with an illustrative embodiment.

FIG. 11 is a diagram of a files interface in accordance with an illustrative embodiment.

FIG. 14 is a diagram of an equipment interface in accordance with an illustrative embodiment.

FIG. 15 is a diagram of a reports interface in accordance with an illustrative embodiment.

DETAILED DESCRIPTION OF THE ILLUSTRATIVE EMBODIMENTS

Figure 1:
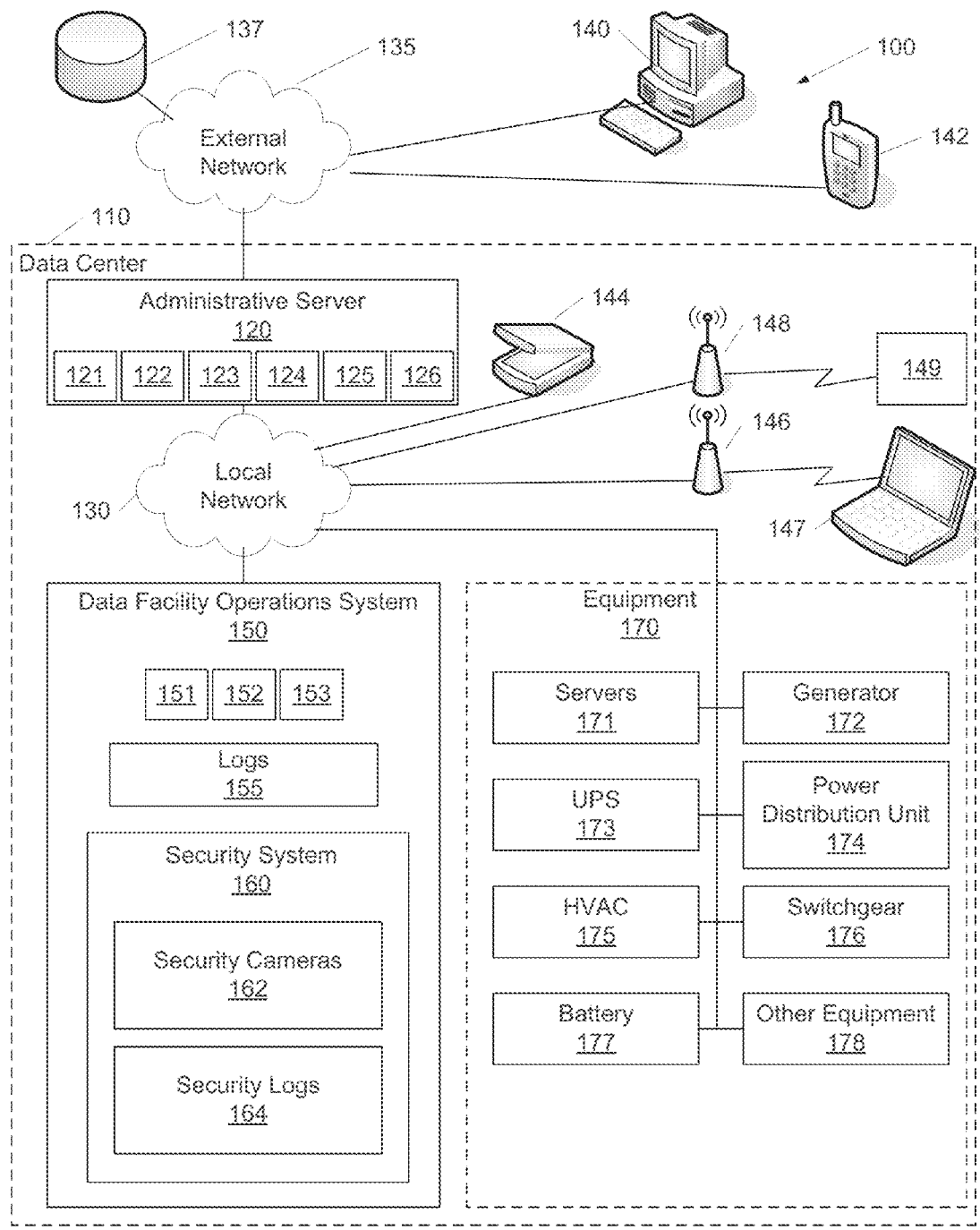
FIG. 1 is a diagram of a data center management system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a data center management system, method, and computer-readable medium. Referring to FIG. 1, a diagram of a data center management system 100 in accordance with an illustrative embodiment is shown. The data center management system 100 can include a data center 110, an external network 135, an external database 137, a computer 140, and a computing device 142. The data center 110 can include an administrative server 120. The external database 137, and the computer 140 and the computing device 142 can be communicatively coupled to the administrative server 120 via the external network 135. The external network 135 can be the Internet, an Ethernet, a Wi-Fi network, a wired or wireless phone network, a dedicated line, a wireless connection, or any other network. The external database 137 can store a copy of information stored on the administrative server 120.

The computer 140 can be a personal computer or any other computer. A user can interface with the administrative server 120 via computer 140. For example, the administrative server 120 can serve a webpage to the computer 140, which enables a user to query information and submit commands. The webpage can be, for example, a hypertext markup language document. Alternatively, an application can be used to interface with the administrative server 120.

The computing device 142 can be a cell phone, a smart phone, a tablet, a personal data assistant, or any other computing device. A user can interface with the administrative server 120 via computing device 142. For example, the administrative server 120 can serve a webpage or mobile webpage to the computing device 142, which enables a user to query information and submit commands. Alternatively, an application can be used to interface with the administrative server 120.

The data center 110 can further include a local network 130, a data facility operations system 150, and equipment 170. The administrative server 120 can be communicatively coupled to the data facility operations system 150 and the equipment 170 via the local network 130. The local network 130 can be an Ethernet, a Wi-Fi network, a wired or wireless phone network, a dedicated line, a wireless connection, or any other network. The local network 130 can further be communicatively coupled to a scanner 144, a wireless network 146, and a location-based identification network 148. The wireless network 146 can be communicatively coupled to a technician computer 147. The location-based identification network 148 can be communicatively coupled to a tag 149.

The data facility operations system 150 can control and log the operations and activities of the data center 110. The data facility operations system 150 can include one or more of, a processor 151, a memory 152, data facility operations system software 153, a display, a user interface, and a transceiver. In alternative embodiments, the data facility operations system 150 may include fewer, additional, and/or different components. The memory 152, which can be any type of permanent or removable computer memory known to those of skill in the art, can be a computer-readable storage medium. The memory 152 can be configured to store one or more of the data facility operations system software 153, an application configured to run the data facility operations system software 153, captured data, and/or other information and applications as known to those of skill in the art. The transceiver of the data facility operations system 150 can be used to receive and/or transmit information through a wired or wireless network as known to those of skill in the art. The transceiver, which can include a receiver and/or a transmitter, can be a modem or other communication component known to those of skill in the art.

The data facility operations system 150 can further include a log 155 and a security system 160. The data facility operations system 150 can be configured to record data facility information in the log 155 as described further below. For example, the data facility operations system 150 can record equipment temperature, facilities temperature, power status, fault status, and other data facility information. [Inventors: Please include other information as appropriate]

In one embodiment, the data facility operations system software 153 can include a computer program (for example, PHP, Python, html code, an applet, and/or a script) and/or an application configured to execute the program (for example, a web browser such as Microsoft Internet Explorer™ or Google Chrome™). Alternatively, other programming languages and/or applications known to those of skill in the art can be used. In one embodiment, the data facility operations system software 153 can be a dedicated standalone application. The processor 151, which can be in electrical communication with each of the components of the data facility operations system 150, can be used to run the application and to execute the instructions of the data facility operations system software 153. Any type of computer processor(s) known to those of skill in the art may be used.

The security system 160 can include security cameras 162 and security logs 164. The security cameras 162 can be located throughout the data center 110. For example, the security cameras 162 can be placed to observe and record the equipment 170 as well as personnel in the data center 110 performing maintenance on the equipment 170. In one embodiment, the security cameras 162 can be associated, in a database, with particular equipment of the equipment 170. The security logs 164 can record entry and exit of personnel and vendors to and from the data center 110. For example, personnel can have a badge encoded with identifying information that is required to obtain entry to the data center 110 or a particular area of the data center 110. In one embodiment, badge swipes can be recorded in the security logs 164.

The equipment 170 can include servers 171, a generator 172, an uninterruptable power supply (UPS) 173, a power distribution unit (PDU) 174, heating ventilation and air conditioning (HVAC) 175, switchgear 176, battery 178, and other equipment 179. The servers 171, the generator 172, the uninterruptable power supply (UPS) 173, the power distribution unit (PDU) 174, the heating ventilation and air conditioning (HVAC) 175, the switchgear 176, the battery 178, and the other equipment 179 can each be communicatively coupled to the administrative server 120 and the data facility operations system 150 via the local network 130. The servers 171, the generator 172, the uninterruptable power supply (UPS) 173, the power distribution unit (PDU) 174, the heating ventilation and air conditioning (HVAC) 175, the switchgear 176, the battery 178, and the other equipment 179 can each send and receive information. For example, servers 171 can send maintenance information to the administrative server 120 and the data facility operations system 150. In another example, the data facility operations system 150 can instruct the generator 172 to activate.

The administrative server 120 can record and control the operations and activities of the data center 110. The administrative server 120 can include one or more of, a processor 121, a memory 122, administrative server software 123, an asset database 124, a personnel database 125, a task database 126, a display, a user interface, and a transceiver. In alternative embodiments, the administrative server 120 may include fewer, additional, and/or different components. The memory 122, which can be any type of permanent or removable computer memory known to those of skill in the art, can be a computer-readable storage medium. The memory 122 can be configured to store one or more of the administrative server software 123, an application configured to run the administrative server software 123, captured data, and/or other information and applications as known to those of skill in the art. The transceiver of the administrative server 120 can be used to receive and/or transmit information through a wired or wireless network as known to those of skill in the art. The transceiver, which can include a receiver and/or a transmitter, can be a modem or other communication component known to those of skill in the art.

The administrative server software 123 can be configured to process and provide an interface for accessing, aggregating, linking, and interpreting the asset database 124, the personnel database 125, and the task database 126. In one embodiment, the entries in the asset database 124, the personnel database 125, and the task database 126 can be cross-linked. For example, data in the asset database 124 can point to data in the personnel database 125 and the task database 126. Further, a voltage test maintenance item of a particular server listed in asset database 124 can point to a scheduled voltage test item stored in the task database 126 and to personnel data in the personnel database 125 providing data about the technician who performed the voltage test. In one embodiment, the administrative server software 123 can be configured to link the voltage test maintenance item, the scheduled voltage test item, and the personnel data. In another embodiment, the administrative server software 123 can be configured to display the voltage test maintenance item, the scheduled voltage test item, and the personnel data.

In one embodiment, the administrative server software 123 can include a computer program (for example, PHP, Python, html code, an applet, and/or a script) and/or an application configured to execute the program (for example, a web browser such as Microsoft Internet Explorer™ or Google Chrome™). Alternatively, other programming languages and/or applications known to those of skill in the art can be used. In one embodiment, the administrative server software 123 can be a dedicated standalone application. The processor 121, which can be in electrical communication with each of the components of the administrative server 120, can be used to run the application and to execute the instructions of the administrative server software 123. Any type of computer processor(s) known to those of skill in the art may be used.

Figure 2:
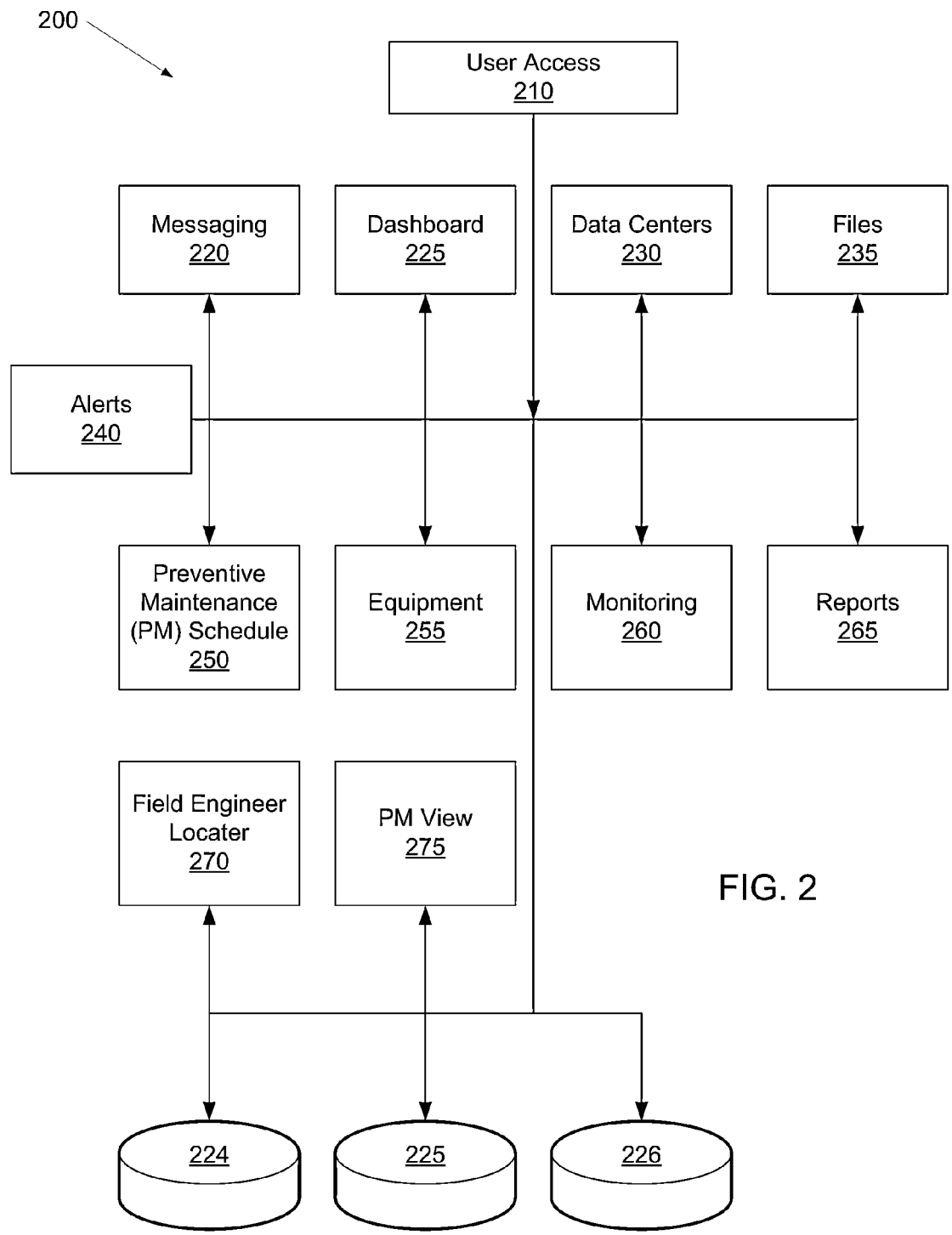
FIG. 2 is a diagram of an administrative server software architecture in accordance with an illustrative embodiment.

Referring now to FIG. 2, a diagram of an administrative server software architecture 200 in accordance with an illustrative embodiment is shown. The administrative server software architecture 200 can include the following application components: an user access component 210, a messaging component 220, a dashboard component 225, a data centers component 230, a files component 235, an alerts component 240, a preventative maintenance (PM) schedule component 250, an equipment component 255, a monitoring component 260, a reports component 265, a field engineer locator component 270, and a PM view component 275. Each of the components can be communicatively coupled to one another. The administrative server software architecture 200 can be configured to manage accounts for multiple companies.

The administrative server software architecture 200 can further include an asset database 224, a personnel database 225, a task database 226. Each of the components can be communicatively coupled to the asset database 224, the personnel database 225, and the task database 226. Alternatively, the asset database 224, the personnel database 225, and the task database 226 can be configured as a single database or distributed across multiple databases.

The asset database 224 can include asset data associated with the equipment in a data center. For example, the asset data can include information regarding equipment type, manufacturer, installation date, and any other information. The asset database 224 can store information regarding each piece of equipment that is under contract. The equipment can include HVAC, generators, uninterruptible Power System, switch gear, automatic transfer switches, remote power panels, power distribution units, batteries, etc. The information on each piece of equipment can include basic specifications (e.g., voltages, runtime, fuel levels), capacity, and age of equipment. The information can also include all contract information regarding each piece of equipment including contract start date, contract end date, recommended replacement dates, and upcoming PM's (i.e., preventative maintenance) to be performed.

The personnel database 225 can include personnel data associated with the personnel and vendors associated with the data center. For example, the personnel data can include information regarding employer, qualifications, work history, and any other information. The personnel database 225 can store all contacts for vendors, data centers and emergency contacts. Each piece of equipment can be linked to a data center contact (i.e., the manager of the site where the equipment is located), a vendor contact (i.e., the person that will perform preventative maintenance on the piece of equipment), and an emergency contact (i.e., the person in charge of a short hour response time). The personnel database 225 can be readily available to an administrator of the data center management system 100, an owner of the data center 110, and the vendors.

The task database 226 can include task data associated with the tasks associated with the data center. For example, the task data can include information regarding task type, equipment worked on, person who performed the task, checklists, confirmations, results, and any other information. The task database 226 can store all field service reports (FSRs). Each field service report can be linked to a specific site, specific vendor, and specific piece of equipment. A field service report can be a scheduled PM or an emergency PM. A scheduled PM FSR can store general information about the equipment, including all current readings and the vendor's recommendations (replace soon, needs part replaced, etc.).

Figure 3:
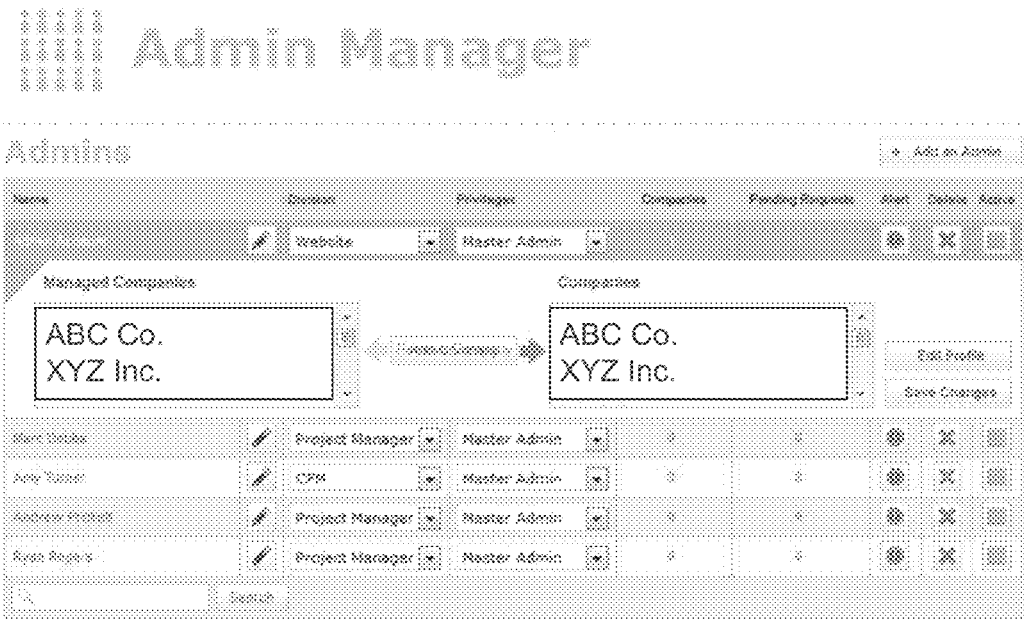
FIG. 3 is a diagram of an administrative level interface in accordance with an illustrative embodiment.
Figure 4:
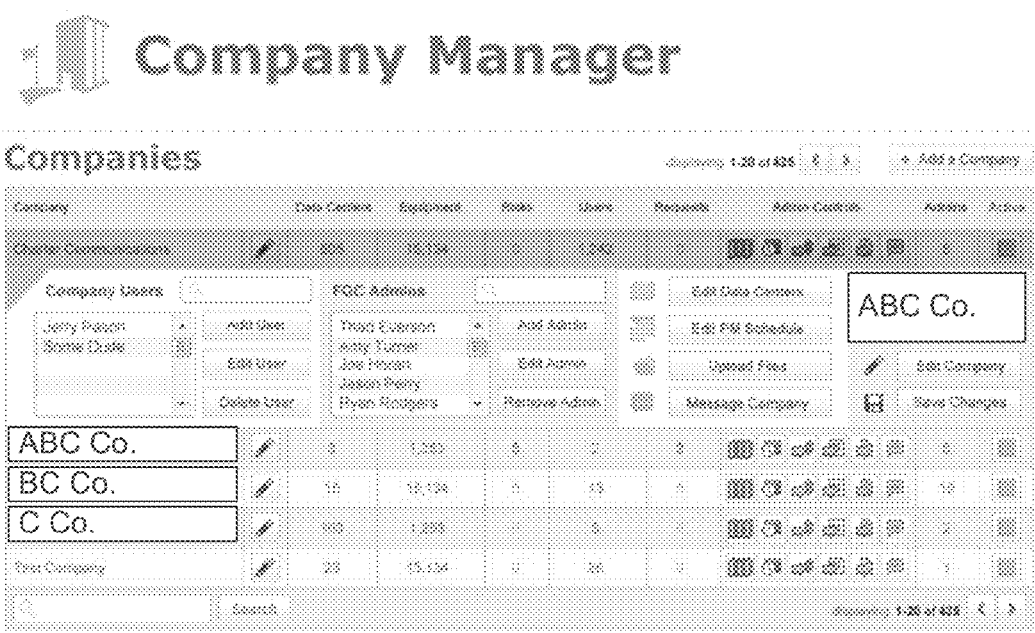
FIG. 4 is a diagram of a company level interface in accordance with an illustrative embodiment.

The user access component 210 can control which users can access and manipulate the application components, the asset database 224, the personnel database 225, and the task database 226. An administrator level user can activate and delete user accounts, set access parameters and levels, define which data centers belong to an account, and delegate authority. For example, the user access component 210 can allow the administrator level user to set which companies' accounts a user can access. FIG. 3 shows a diagram of an administrative level interface 300 in accordance with an illustrative embodiment. Referring again to FIG. 2, account information can include overviews of each company including total data centers, total equipment, total users, number of requests pending, number of equipment at risk, and a list of administrators overseeing the account. FIG. 4 shows a diagram of a company level interface 400 in accordance with an illustrative embodiment. Referring again to FIG. 2, the user access component 210 can further allow an administrator to activate or deactivate accounts. The user access component 210 can grant privileges including user editing/adding/deleting, admin adding/deleting, and also the ability to control the companies' data centers, equipment, reports, files, name, and images.

Figure 5:
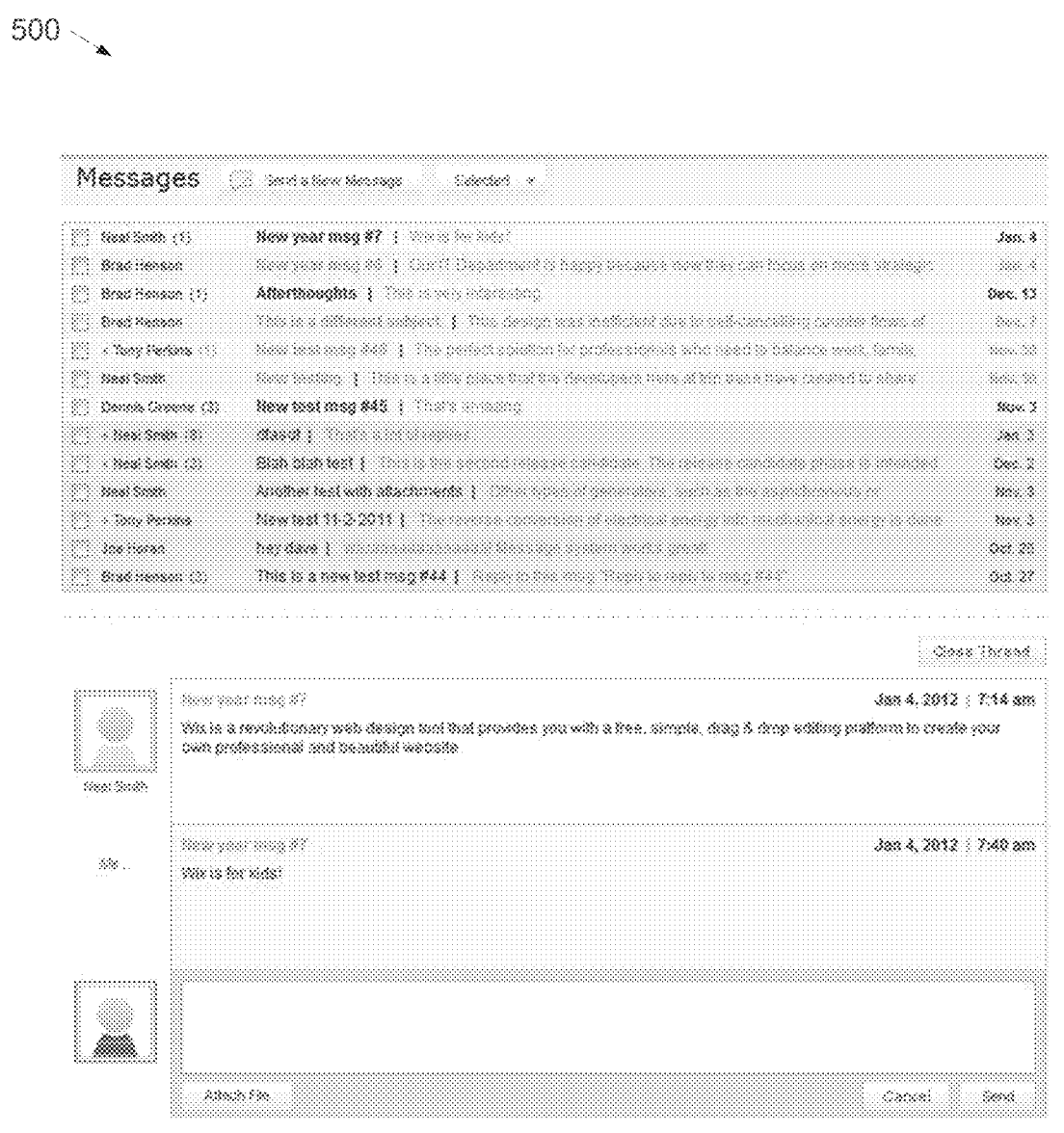

The messaging component 220 can send and receive messages between administrators, users, personnel, vendors, and other outside parties. For example, an administrator can send a user an update regarding a work schedule. In another example, an administrator can send and receive messages to and from vendors that perform maintenance at a data center. In addition, the messaging component 220 can send alerts to administrators, users, personnel, vendors, and other outside parties. FIG. 5 shows a diagram of a messaging interface 500 in accordance with an illustrative embodiment.

The messaging component 220 can be a general tracking tool for reducing emails between an administrator and companies. The messages can be stored and accessed in a central location, so in case of emergency service, all administrators can be able to see all messages to and from a company to other administrators. These messages can also be linked to files and reports.

Figure 6:
FIG. 6 is a diagram of an administrative level dashboard interface in accordance with an illustrative embodiment.
Figure 7:
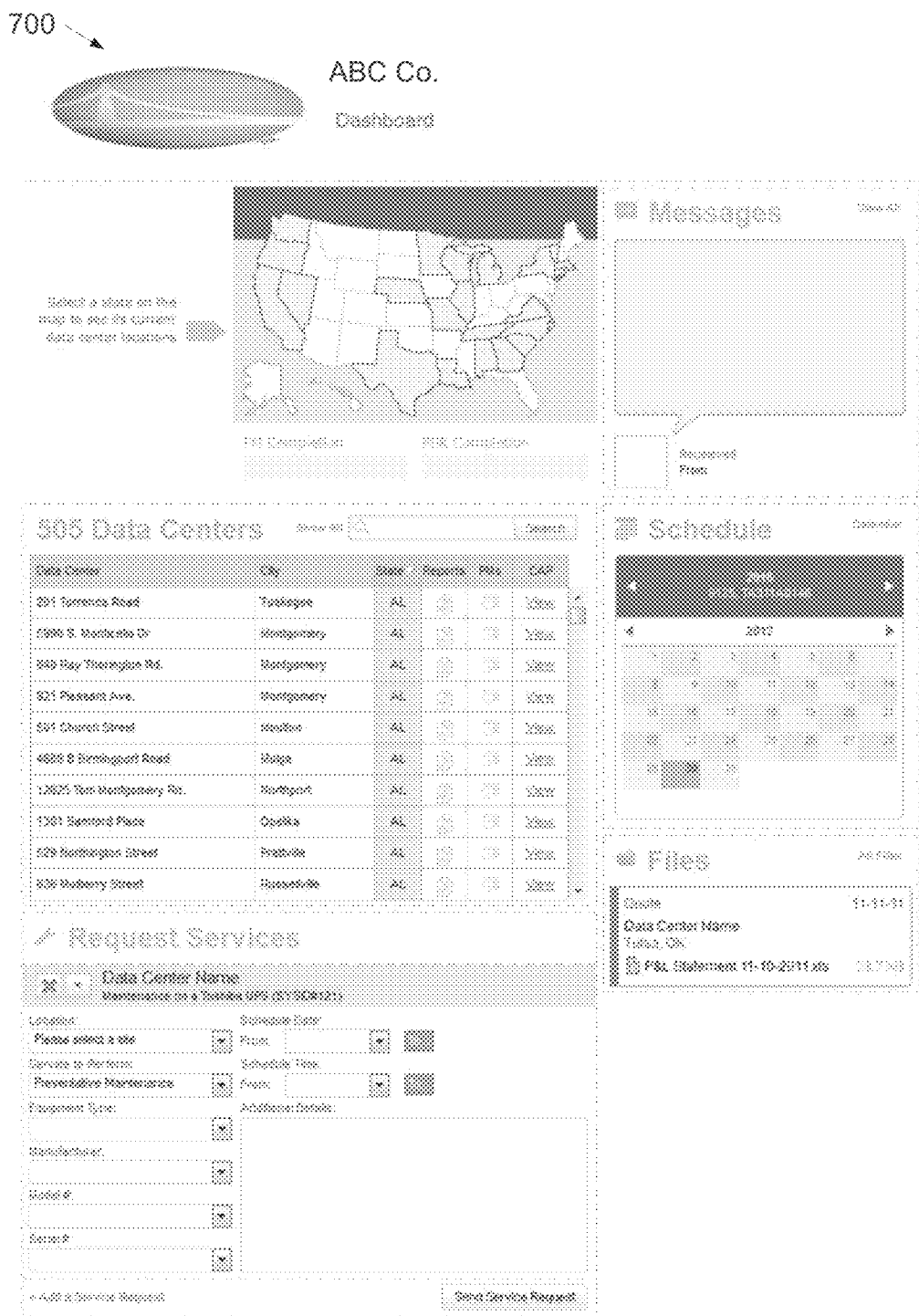
FIG. 7 is a diagram of a user level dashboard interface in accordance with an illustrative embodiment.

Referring again to FIG. 2, the dashboard component 225 can provide an interface for administrators, users, personnel, vendors, and other outside parties. For example, the dashboard component 225 can generate a quick overview of data centers the user been selected to view. The dashboard component 225 can generate an interactive map which allows for the user to select a specific data center and see live stats. The dashboard component 225 can display the most recent message received from another user or administrator. The dashboard component 225 can display upcoming performing maintenance for the selected site and recent files for the selected site. The dashboard component 225 can also be configured to allow the user to request services needed, including change a PM date, requesting a new PM, or a new quote for equipment replacement. FIG. 6 shows a diagram of an administrative level dashboard interface 600 in accordance with an illustrative embodiment. FIG. 7 shows a diagram of a user level dashboard interface 700 in accordance with an illustrative embodiment.

Figure 8:
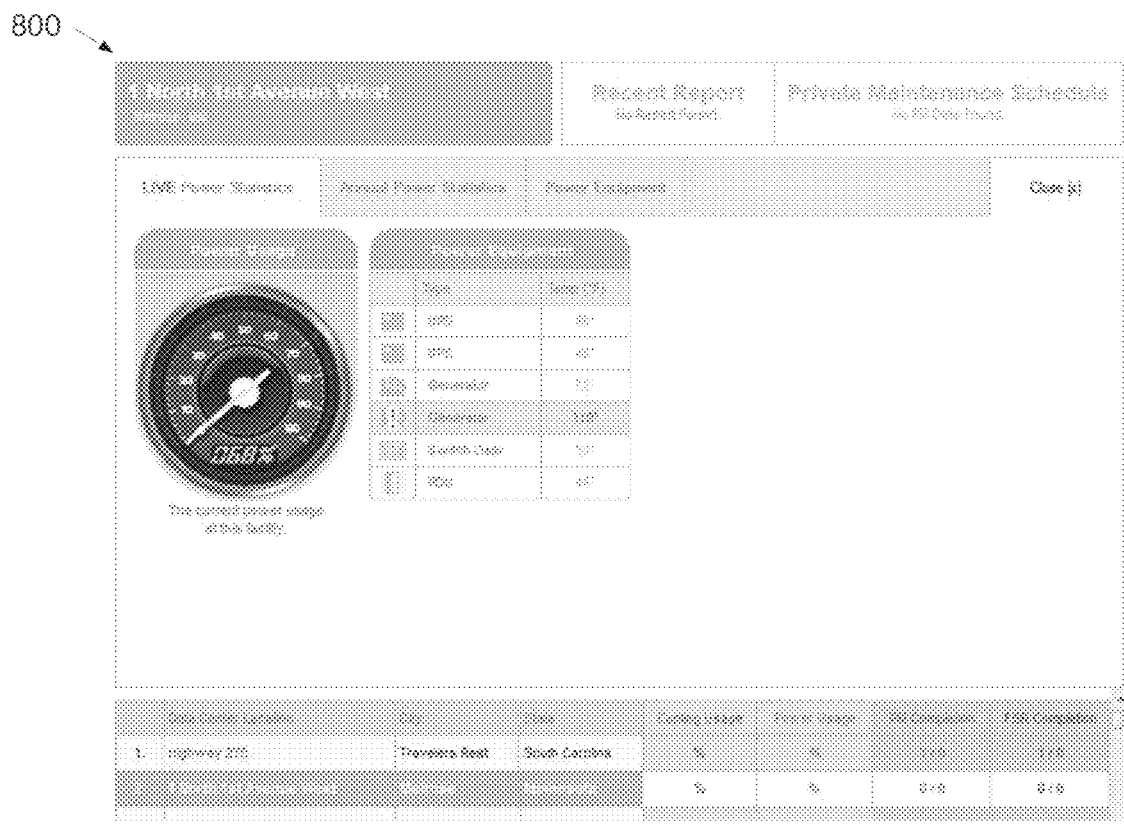
FIG. 8 is a diagram of a live data centers interface in accordance with an illustrative embodiment.

Referring again to FIG. 2, the data centers component 230 can provide an interface for selecting and managing data centers. The data centers component 230 can include an overview map to select data centers available to the user. The data centers component 230 can also include a complete list of data centers available to the user, which is also searchable. The data centers component 230 can display live power readings and live temperature readings via equipment monitoring software. FIG. 8 shows a diagram of a live data centers interface 800 in accordance with an illustrative embodiment.

Figure 9:
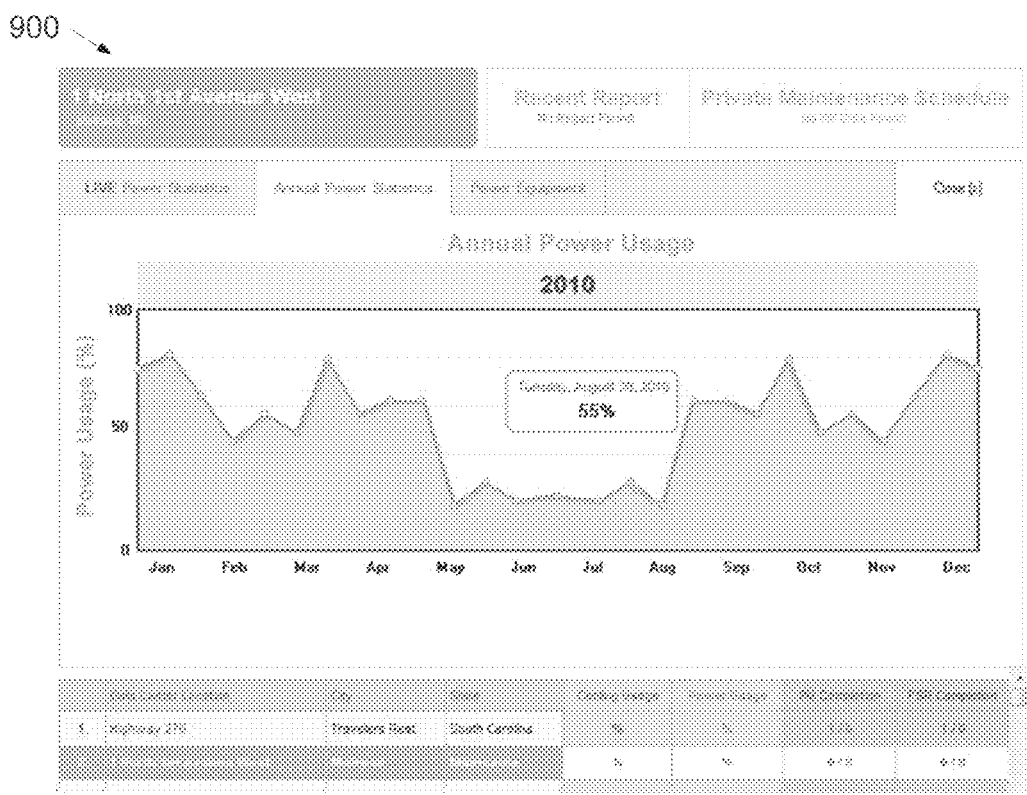
FIG. 9 is a diagram of a historical data centers interface in accordance with an illustrative embodiment.
Figures 10, 11:
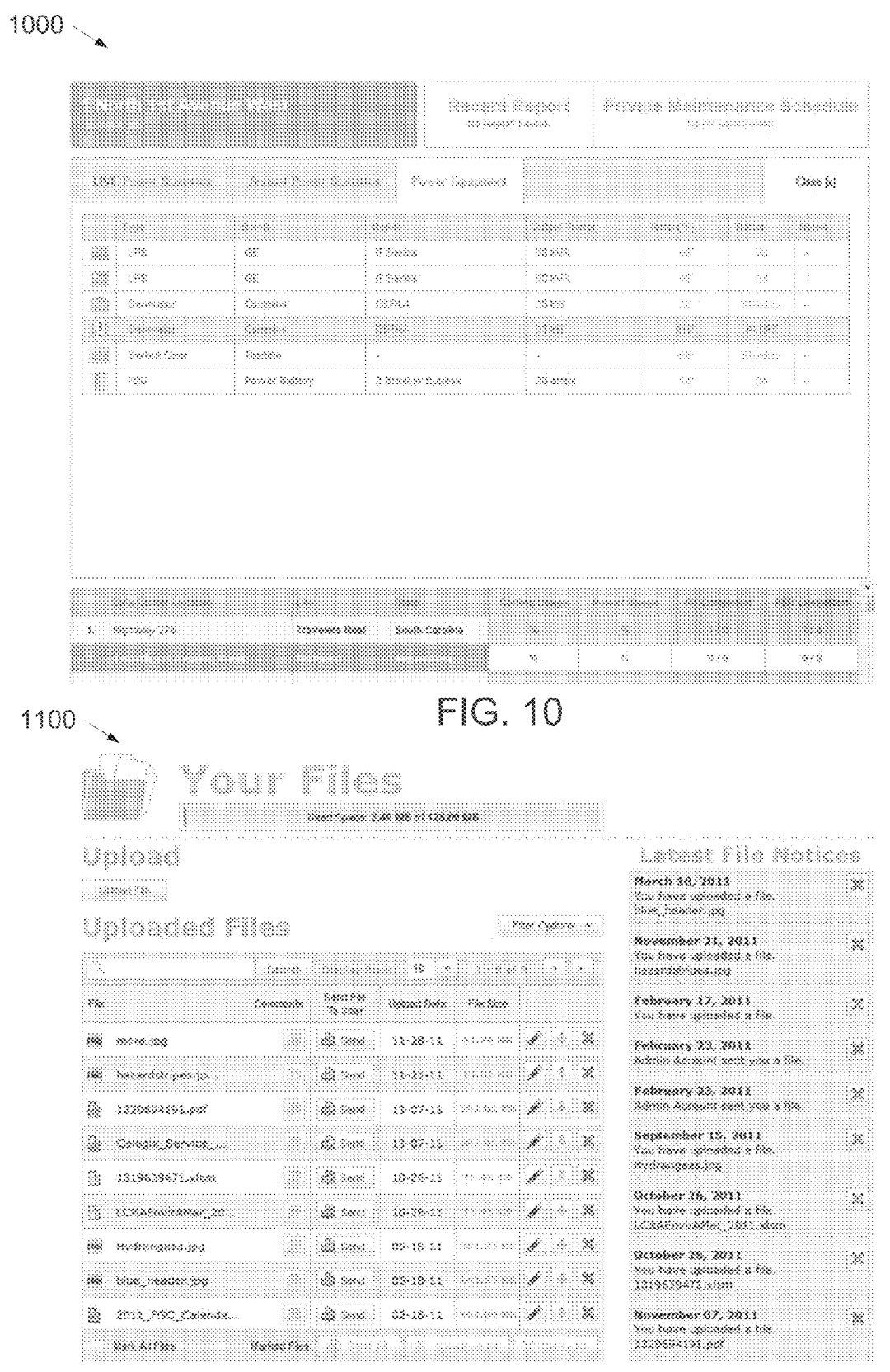

Referring again to FIG. 2, the data centers component 230 can also display recorded statistics as a graph, for example, annual power usage, annual temperatures, and annual loads. The data centers component 230 can also include a complete list of equipment at a data center, displaying all information available for each piece of equipment. The data centers component 230 can display load usage, input & output voltages, temperature, risk factors, status (on/offline), basic equipment details (manufacturer, model, type), maintenance notes, and user notes. FIG. 9 shows a diagram of a historical data centers interface 900 in accordance with an illustrative embodiment. FIG. 10 shows a diagram of a list-based data centers interface 1000 in accordance with an illustrative embodiment.

Referring again to FIG. 2, the files component 235 can provide an interface for selecting and managing files. The files component 235 can display a list of files available to the user. The files can be associated with a particular data center and/or a particular piece of equipment. The files can include policy files, procedures files, personnel files, security files, equipment files, drawing files, quote files, and 3D rendering files of future/current data centers.

Files can be available per data center. Each file can be linked to a specific data center and to the administrator (or company user) who uploaded the file originally. FIG. 11 shows a diagram of a files interface 1100 in accordance with an illustrative embodiment.

Figure 12:
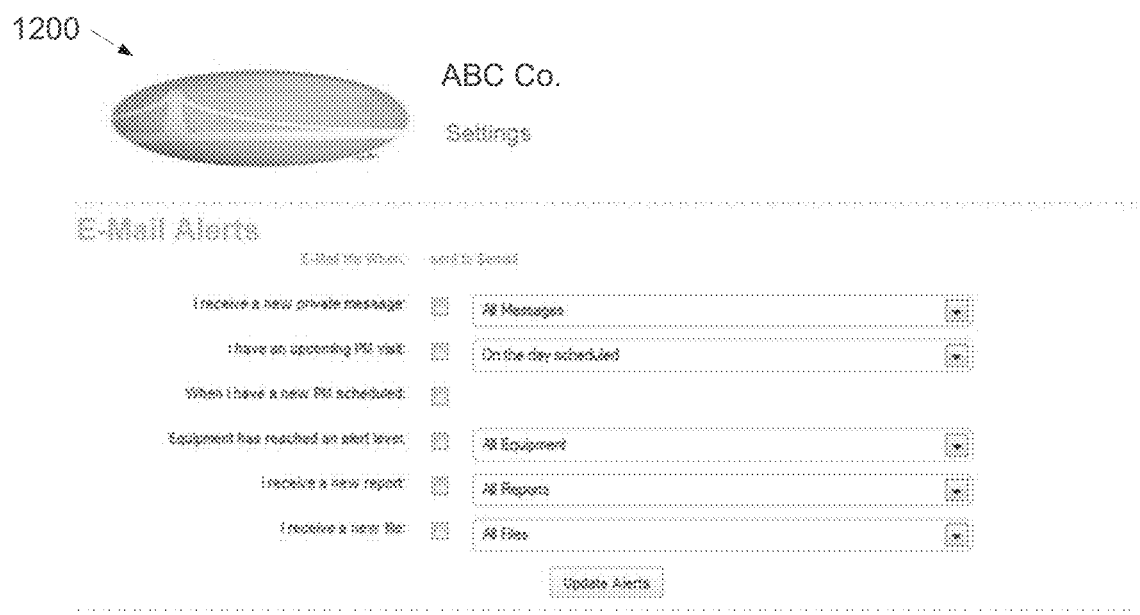
FIG. 12 is a diagram of an alerts interface in accordance with an illustrative embodiment.

Referring again to FIG. 2, the alerts component 240 can generate messages regarding upcoming PM visits, new PM visits, equipment alerts, file changes and reports. The alerts component 240 can send the messages to other components for processing and display. Alerts can be available on a webpage (every page in the portal) or in an email. Alerts can be based on user settings, and each user can control what alerts they want to receive. For example, alerts can be set for: messages (all messages, new messages, reply to messages); upcoming PM's (day of scheduled pm, 3 days in advance, 1 week in advance, 2 weeks in advance, 1 month in advance); PM schedule (a new pm has been scheduled); equipment alert levels (power equipment, cooling equipment, all equipment) new reports (all reports, new field service reports, new cap reports, new cooling reports, new power reports, new summary reports) and new files (new drawings, all files, new quotes). FIG. 12 shows a diagram of an alerts interface 1200 in accordance with an illustrative embodiment.

Figure 13:
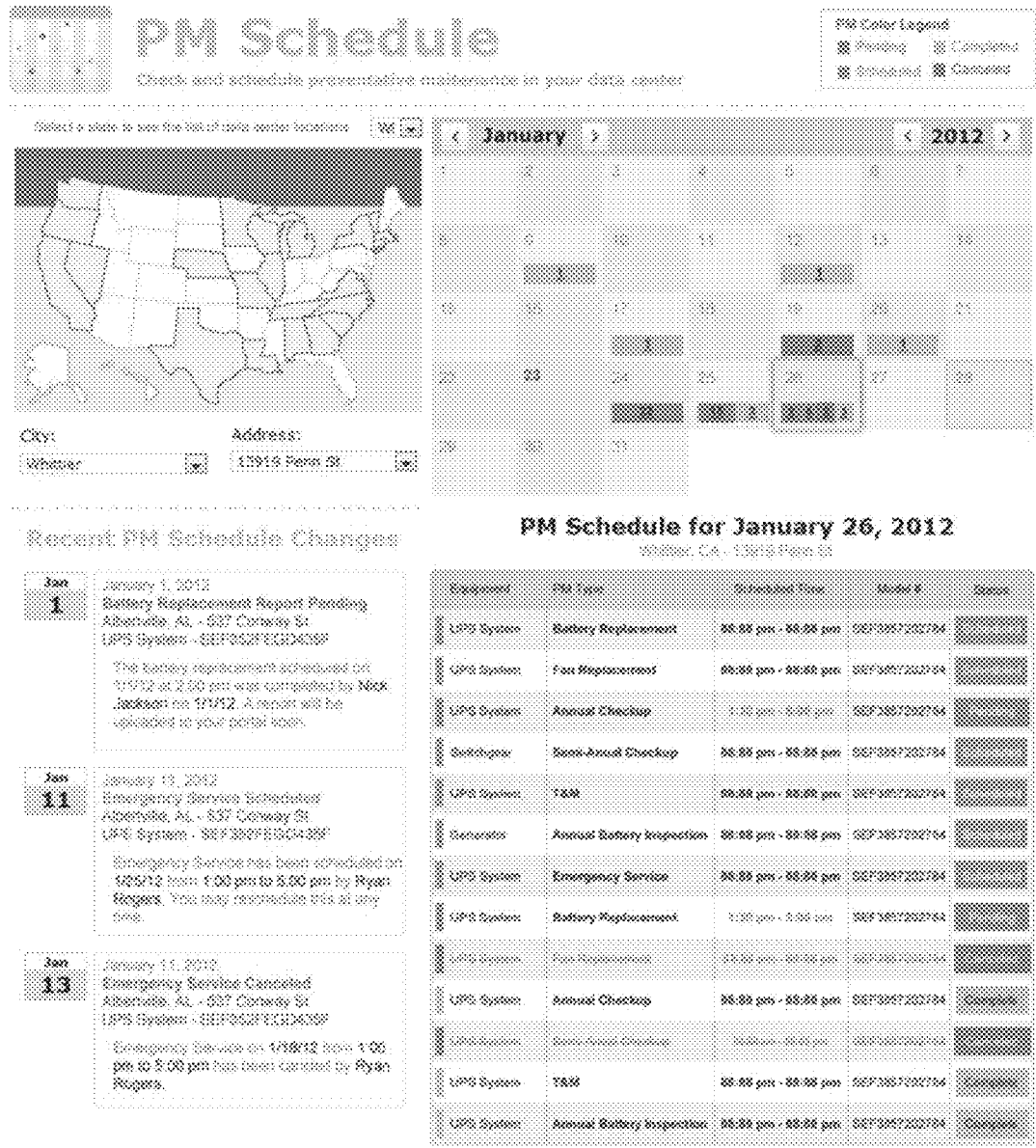
FIG. 13 is a diagram of a preventative maintenance schedule interface in accordance with an illustrative embodiment.

Referring again to FIG. 2, the preventative maintenance schedule component 250 can be configured to track and schedule preventative maintenance events. The preventative maintenance schedule component 250 can include an interactive flash map, which allows the user to pick a specific state narrowing the results for the city dropdown select. Once the city is selected an address dropdown can populate according to that city & state. The preventative maintenance schedule component 250 can display recent PM schedule changes and show PM changes for all data centers the user has access too. The preventative maintenance schedule component 250 can also display a calendar overview for the data centers and/or a list of scheduled/canceled and completed PM for the data center. FIG. 13 shows a diagram of a preventative maintenance schedule interface 1300 in accordance with an illustrative embodiment.

Figures 14, 15:
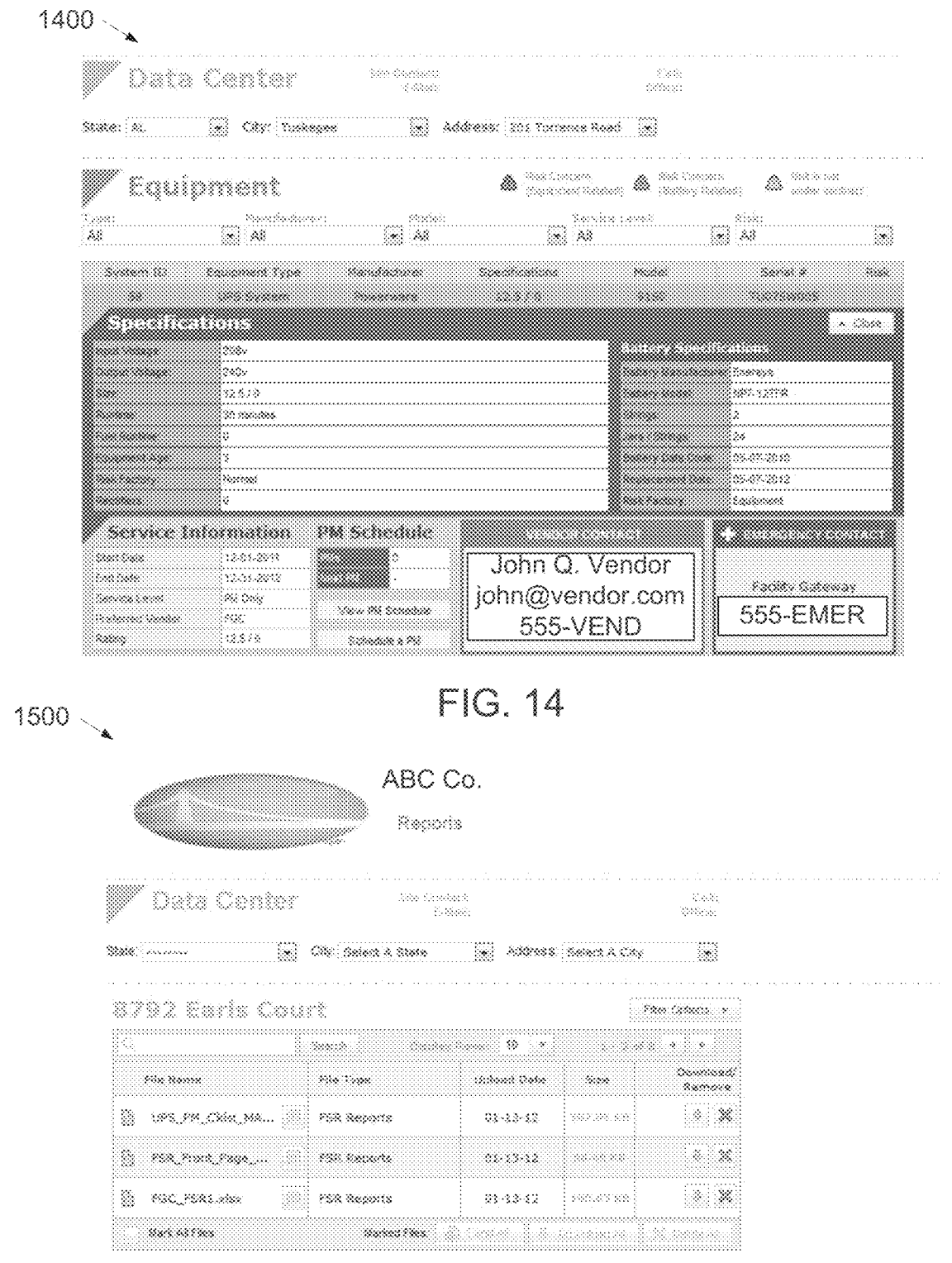

Referring again to FIG. 2, the equipment component 255 can display a list of equipment at a data center or multiple data centers. In one embodiment, the equipment list has different filters a user may select from, including type, manufacturer, model, service level and risk. Once a piece of equipment has been selected, the actual details of the equipment can be shown. For example, the details can include battery information, drawings, policies, PM schedules, reports, and request services. The equipment list can also include vendor contacts, emergency contacts, and service information about a particular piece of equipment. Equipment can be broken up by data center. Each equipment list can also be filterable by type of equipment, capacity, contract type, risk of equipment, manufacturer, and model. Data center information can show the site contact, and information for each piece of equipment can show the vendor contact and emergency contact. The equipment component 255 can display all future/past PM's scheduled for each piece of equipment, and all reports to go along with those PM's. A user can also request an emergency PM for equipment using the equipment component 255. FIG. 14 shows a diagram of an equipment interface 1400 in accordance with an illustrative embodiment.

Referring again to FIG. 2, the monitoring component 260 can collect, store and distribute information associated with managing and maintaining a data center. For example, after a technician performs a task on a piece of equipment, he can submit a field service report (FSR) to the monitoring component 260. The field service report can indicate the task to be performed, the equipment associated with the task, the personnel assigned to complete the task, and a task period. In one embodiment, the field service report can be entered using a web portal on a technician's laptop or other computing device. In another embodiment, the technician can scan the field service report into a scanner communicatively coupled to an administrative server associated with the administrative server software architecture 200. The monitoring component 260 can parse and store the field service report into one or more of the asset database 224, the personnel database 225, and the task database 226. Alternatively, the equipment and/or data center can automatically detect field service work performed by technicians.

In one embodiment, the monitoring component 260 can collect details about equipment and data centers while preventative maintenance is being performed. The monitoring component 260 can track a technician (field service engineer) from the moment he enters the data center. The monitoring component 260 can track a path the technician takes to the equipment, and the path he takes to exit the data center. The tracking information can be used to make sure hours billed are correct, and make sure technicians are not tampering with other pieces of equipment at the data center. The monitoring component 260 can be configured to notify an administrator, owner, or vendor of any emergency PM that was performed without notification by the company under contract. (the company under contract may contact the vendor directly instead of the administrator).

The reports component 265 can display report files for a data center or multiple data centers. Reports files can include CAP reports, PM schedule, summary reports, cooling reports, power reports, and field service reports (FSR). A user can select a state, city than address in order to see reports available for each specific data center. The reports component 265 can display a field engineer's comments on the report. FIG. 15 shows a diagram of a reports interface 1500 in accordance with an illustrative embodiment.

Reports can be available per data center. Each report can be linked to a PM Schedule calendar, and the piece of equipment the PM was performed on. The report can also have information about the technician (field engineer) who performed the PM. These stats will be logged into a database to help generate future reports, including power usage, cooling usage, load changes, voltage changes, and also help generate reports on faulty equipment types (e.g., a specific brand of equipment).

Referring again to FIG. 2, the field engineer locator component 270 can track and record a technician's (field engineer) movement in a data center. For example, a technician can wear a tag in the form of a badge that can be tracked by a location-based identification network. The tag can be associated with a particular technician. The location-based identification network can, for example, determine the location of the tag using a global positioning system, cell tower triangulation, radio triangulation, or other location methods as are known in the art. The location-based identification network can send tag location information to the field engineer locator component 270. The field engineer locator component 270 can generate a display of a real-time location of the technician or a location history of the technician. The display can be a map or a statement of location. The field engineer locator component 270 can send the location history of the technician to the monitoring component 260 for storage and association of the location history with a particular task. Advantageously, a user can determine if an appropriate amount of time was spent in the proximity of a piece of equipment in order to determine if a task was properly preformed.

The preventive maintenance (PM) view component 275 can track and record a technician's (field engineer) activities in a data center. For example, a security camera can record a video of a technician's work on a particular piece of equipment. The security camera location can be associated with a particular piece of equipment. The preventive maintenance (PM) view component 275 can generate a display of a real-time video of the technician or a video history of the equipment and the technician performing a task. The preventive maintenance (PM) view component 275 can send the video history of the equipment and the technician performing the task to the monitoring component 260 for storage and association of the video history with a particular task. Advantageously, a user can determine if an appropriate amount of time was spent in the proximity of a piece of equipment and/or whether the technician appeared to perform the correct procedures in order to determine if a task was properly preformed.

Figure 16:
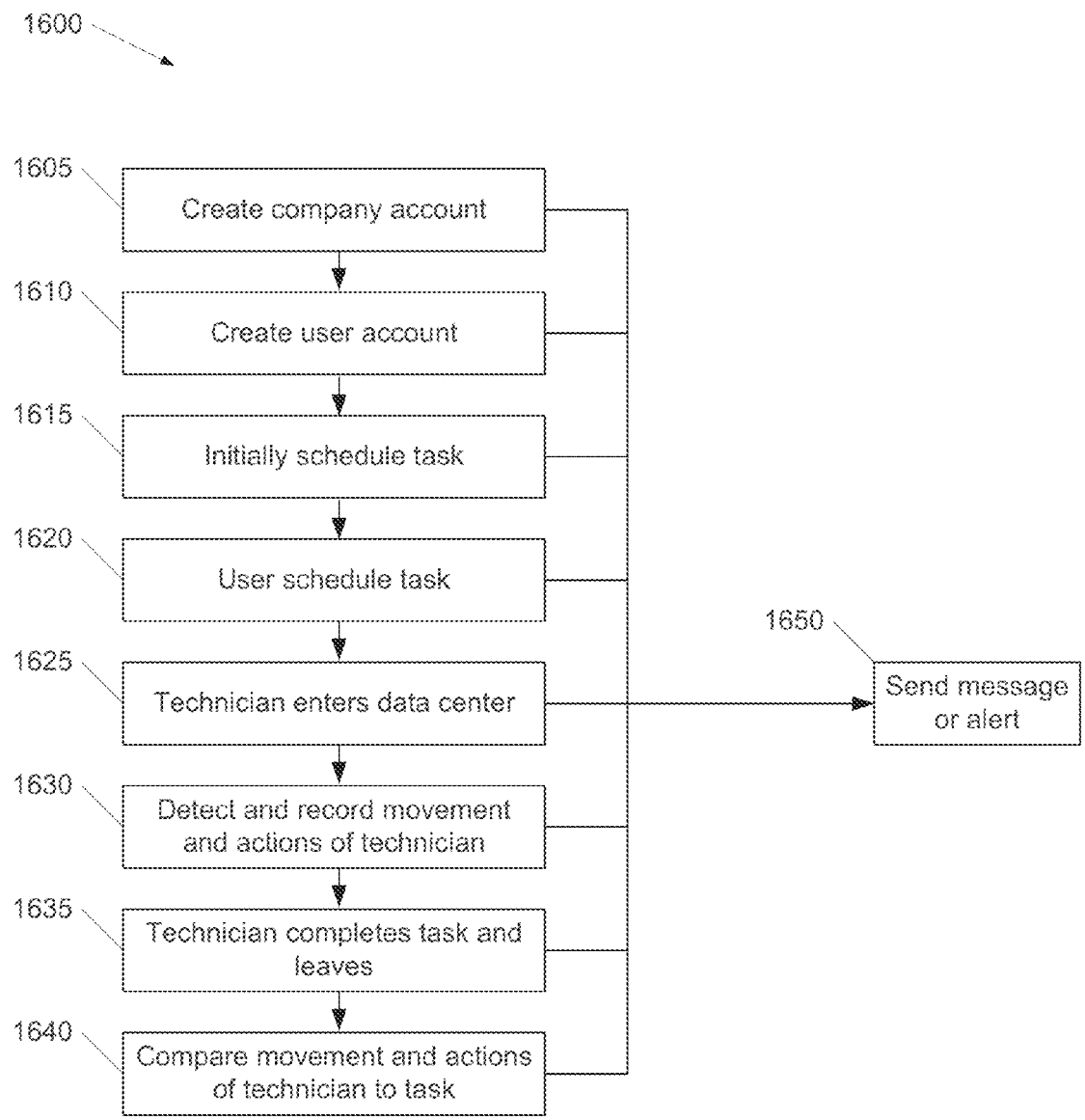
FIG. 16 is a flow diagram of a method of data center management in accordance with an illustrative embodiment.

Referring now to FIG. 16, a flow diagram of a method of data center management 1600 in accordance with an illustrative embodiment is shown. Additional, fewer, or different operations may be performed depending on the particular implementation. The operations for data center management 1600 can be executed, for example, in least in part by a system for data center management, such as the system described above.

In an operation 1605, an administrator can create a company account for a company that can include one or more data centers. The company account will hold all information relative to that company. Once the company account is created, the administrator can associate data center information with the company account. The data center information can include information regarding all site locations and information regarding each piece of equipment located at the sites. For example, the equipment information can include information regarding an equipment service contract. When the account is created, in an operation 1650, the system can send a message informing the administrator.

In an operation 1610, the administrator can create one or more user accounts for the company account. In one embodiment, the administrator can select the data center sites that the user may have control of. The user accounts can include, for example, accounts for owners and vendors. When the user accounts are created, in the operation 1650, the system can send a message informing the administrator and users.

In an operation 1615, a task can be initially scheduled. In one embodiment, the administrator can create one or more tasks, such as preventative maintenance (PM) for a specific data center, a piece or pieces of equipments, and a date/time. In another embodiment, the one or more tasks can be automatically generated, for example, based on standard maintenance and operating procedures. In addition, a user can create one or more tasks. In one embodiment, the user can set rules for automatic task scheduling. When the tasks are initially scheduled, in the operation 1650, the system can send a message informing the administrator, users, and vendors.

In an operation 1620, the task can be user scheduled. In one embodiment, the user can edit the task or request a change to the task. For example, when the user requests a change to the task, in the operation 1650, the system can send a message informing the administrator create one or more tasks, such as preventative maintenance (PM) for a specific data center, a piece or pieces of equipments, and a date/time. The administrator can contact the site manager (generally the user who requested a time change) and select a suitable date and time for both people. In another embodiment, the message can be sent to the vendor. In another embodiment, the one or more tasks can be automatically generated, for example, based on standard maintenance and operating procedures.

In an operation 1625, a technician can enter the data center to perform the task. The data center can include a security system as described above. The security system can record a name of the technician, an associated task, the associated vendor, and time of entry. The technician can be issued a tag, as described above. Once the technician checks in, the security system can begin tracking and recording the technician's movement and activities. When the technician enters the data center, in the operation 1650, the system can send a message informing the administrator, users, and vendors.

In an operation 1630, the movement and actions of the technician can be detected and recorded. In one embodiment, the security system can track the movements of a technician using the tag. For example, the security system can detect a location of the tag and record the location periodically. In another embodiment, the security system can record a video of the technician performing the task. For example, when the technician is located by the piece of equipment associated with the task, the security system can activate a camera directed at the piece of equipment, and record the technician's actions.

In an operation 1635, the technician can complete the task and leave the data center. The technician can check out and submit a field service report (FSR) to the system. For example, the FSR can be filled out using a webpage interface or by scanning a paper version of the FSR. Once the FSR is in the system, the FSR can be linked to the task (PM), the data center and the piece of equipment. In the operation 1650, the FSR can be sent to the administrator to alert the administrator of the completion of the task.

In an operation 1640, the movement and action of the technician can be compared to the task. In one embodiment, the system can determine how much time the technician spent at a location of the task equipment. The system can then compare the time the technician spent at the location of the task equipment to an average time to complete the task. If the time the technician spent at the location of the task equipment is lower than a completion threshold, which can be a predetermined threshold, then the system indicate that the task may not be completed properly (i.e. flag the task). If the time the technician spent at the location of the task equipment is higher than an efficiency threshold, which can be a predetermined threshold, then the system indicate that the technician may be inefficient. The administrator can then view the video of the technician's actions to determine is the task was completed or if the technician is inefficient. In the operation 1650, an indication message can be sent to the administrator to alert the administrator of a task that may need further review. In another embodiment, the system can compare the location information of the technician to the task(s) assigned in order to determine if the technician spent an inordinate amount of time at unassigned equipment or in unassigned areas.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for managing a data center, comprising:
one or more databases configured to store asset information, personnel information, and task information, wherein the stored asset information, the stored personnel information, and the stored task information are linked within the one or more databases such that the stored asset information, the stored personnel information, and the stored task information point to each other within the one or more databases; and
a processor configured to:
receive, from a security system of the data center, recorded personnel information associated with a task on an asset in the data center and recorded personnel activities associated with the task, wherein the security system is configured to record the personnel information associated with die task in security logs and to record the personnel activities associated with the task with security cameras;
store the recorded personnel information and the recorded personnel activities into the one or more databases;
determine a completion of the task based on the recorded personnel information and the recorded personnel activities;
determine an amount of time spent by a technician at a location of the task;
compare the amount of time spent by the technician at the location of the task to a predetermined threshold amount of time; and
in response to a determination that the time spent by the technician at the location of the task exceeds the predetermined threshold amount of time:
generate a flag indicating that the task may not have been performed properly; and
send an alert message to an administrator requesting the administrator review the recorded personnel information associated and the recorded personnel activities associated with the task to determine if the task was performed properly.

2. The apparatus of claim 1, wherein the task comprises preventive maintenance on equipment.

3. The apparatus of claim 1, wherein the recorded personnel information comprises a location of the technician assigned to complete the task during a task period.

4. The apparatus of claim 3, wherein determining the completion of the task comprises matching the location of the technician with a location of equipment associated with the task during the task period.

5. The apparatus of claim 1, wherein the recorded personnel activities comprise a video of the technician assigned to complete the task at a location of associated equipment during a task period.

6. The apparatus of claim 5, wherein determining the completion of the task comprises detecting activity in the video at the location of the associated equipment during the task period.

7. The apparatus of claim 1, wherein the one or more databases comprise an asset database, a personnel database, and a task database, and wherein the stored asset information, the stored personnel information, and the stored task information are linked within the one or more databases such that the stored asset information, the stored personnel information, and the stored task information point to each other within the respective asset database, personnel database, and task database.

8. The apparatus of claim 1, wherein the personnel information recorded in the security logs comprises a name of a technician assigned to the task, the associated task, time of entry of the technician to the data center, and time of exit of the technician from the data center, wherein the personnel information recorded in the security logs further comprises the technician's movement in the data center, wherein the security system is configured to track and record the technician's movement by a location-based identification network utilizing identification badges, and wherein the personnel activities recorded in the security cameras comprise a first path the technician takes to the piece of asset and a second path the technician takes to exit the data center.

9. The apparatus of claim 1, wherein the processor is further configured to parse a field service report and information from fields of the parsed field service report into the one or more databases, wherein the field service report indicates the task performed, the piece of asset associated with the task, and personnel assigned to the task.

10. A method of managing a data center, comprising:
recording within one or more databases, by a processor, task information associated with a task and asset information associated with the task;
receiving, by a processor, from a security system of the data center, personnel information associated with a task on an asset in the data center and personnel activities associated with the task, wherein the security system is configured to record the personnel information associated with the task in security logs and to record the personnel activities associated with the task by security cameras; and
storing, by the processor, the personnel information and the personnel activities into the one or more databases, wherein the task information, the asset information, and the personnel information are linked within the one or more databases such that the task information, the asset information, and the personnel information point to each other within the one or more databases;
determining, by the processor, a completion of the task based on the personnel first task information and the personnel activities;
determining, by the processor, an amount of time spent by a technician at a location of the task;
comparing, by the processor, the amount of time spent by the technician at the location of the task to a predetermined threshold amount of time; and
in response to a determination that the time spent by the technician at the location of the task exceeds the predetermined threshold amount of time:
generating, by the processor, a flag indicating that the task may not have been performed property; and
sending an alert message from the processor to an administrator requesting the administrator review the recorded personnel information associated and the recorded personnel activities associated with the task to determine if the task was performed properly.

11. The method of claim 10, wherein the personnel information comprises a location of the technician assigned to complete the task during a task period.

12. The method of claim 11, wherein determining the completion of the task comprises matching the location of the technician with a location of equipment associated with the task during the task period.

13. The method of claim 10, wherein the personnel activities comprise a video of the technician assigned to complete the task at a location of associated equipment during a task period.

14. The method of claim 13, wherein determining the completion of the task comprises detecting activity in the video at the location of the associated equipment during the task period.

15. A non-transitory computer-readable storage medium having instructions stored thereon that, if executed by a computing device, cause the computing device to perform operations comprising:
   recording within one or more databases task information associated with a task and asset information associated with the task;
   receiving, from a security system of the data center, personnel information associated with a task on an asset in the data center and personnel activities associated with the task, wherein the security system is configured to record the personnel information associated with the task in security logs and to record the personnel activities associated with the task by security cameras; and
   storing the personnel information and the personnel activities into the one or more databases, wherein the task information, the asset information, and the personnel information are linked within the one or more databases such that the task information, the asset information, and the personnel information point to each other within the one or more databases;
   determining a completion of the task based on the personnel first task information and the personnel activities;
   determining an amount of time spent by a technician at a location of the task;
   comparing the amount of time spent by the technician at the location of the task to a predetermined threshold amount of time; and
   in response to a determination that the time spent by the technician at the location of the task exceeds the predetermined threshold amount of time:
      generating a flag indicating that the task may not have been performed properly; and
      sending an alert message to an administrator requesting the administrator review the recorded personnel information associated and the recorded personnel activities associated with the task to determine if the task was performed properly.

16. The computer-readable storage medium of claim 15, wherein the personnel information comprises a location of the technician assigned to complete the task during a task period, and wherein determining the completion of the task comprises matching the location of the technician with a location of equipment associated with the task during the task period.

17. The computer-readable storage medium of claim 15, wherein the personnel activities comprise a video of the technician assigned to complete the task at a location of associated equipment during a task period.

18. The computer-readable storage medium of claim 17, wherein determining the completion of the task comprises detecting activity in the video at the location of the associated equipment during the task period.

19. The apparatus of claim 15, wherein the processor is further configured to compare the amount of time spent by the technician at the location of the task to a previously determined average amount of time to complete a similar task.

* * * * *